US011055808B2

(12) United States Patent
Du et al.

(10) Patent No.: US 11,055,808 B2
(45) Date of Patent: Jul. 6, 2021

(54) METHODS AND APPARATUS FOR WAVE SLOT MANAGEMENT

(71) Applicant: QUALCOMM Incorporated, San Diego, CA (US)

(72) Inventors: Yun Du, San Diego, CA (US); Andrew Evan Gruber, Arlington, MA (US); Chun Yu, Rancho Santa Fe, CA (US); Zilin Ying, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/455,641

(22) Filed: Jun. 27, 2019

(65) Prior Publication Data
US 2020/0410626 A1    Dec. 31, 2020

(51) Int. Cl.
*G06T 1/20*  (2006.01)
*G06T 1/60*  (2006.01)

(52) U.S. Cl.
CPC . *G06T 1/20* (2013.01); *G06T 1/60* (2013.01)

(58) Field of Classification Search
CPC . G06T 1/20; G06T 1/60; G06F 9/3851; G06F 9/461; G06F 9/462; G06F 9/48; G06F 9/4881; G06F 9/5038; G06F 8/441
USPC ........ 345/501, 503, 536, 537, 559; 718/100, 718/103, 106, 107, 108
See application file for complete search history.

(56) References Cited

U.S. PATENT DOCUMENTS

| 6,118,462 A * | 9/2000 | Margulis ............. G06F 13/1605 |
| | | 345/501 |
| 2014/0092102 A1* | 4/2014 | Sigg ........................ G06T 17/00 |
| | | 345/501 |

(Continued)

FOREIGN PATENT DOCUMENTS

| CN | 108476042 A | 8/2018 |
| WO | 2016196404 A1 | 12/2016 |
| WO | 2018098012 A1 | 5/2018 |

OTHER PUBLICATIONS

Lee Y., "Decoupled Vector-Fetch Architecture with a Scalarizing Compiler", Electrical Engineering and Computer Sciences, University of California at Berkeley, May 24, 2016, 159 pages.

(Continued)

*Primary Examiner* — Jacinta M Crawford
(74) *Attorney, Agent, or Firm* — Procopio, Cory, Hargreaves & Savitch

(57) ABSTRACT

The present disclosure relates to methods and apparatus for graphics processing. In some aspects, the apparatus can determine one or more context states of at least one context register in each of multiple wave slots. The apparatus can also send information corresponding to the one or more context states in one of the multiple wave slots to a context queue. Further, the apparatus can convert the information corresponding to the one or more context states to context information compatible with the context queue. The apparatus can also store the context information compatible with the context queue in the context queue. In some aspects, the apparatus can send the context information compatible with the context queue to one of the multiple wave slots. Additionally, the apparatus can convert the context information compatible with the context queue to the information corresponding to the one or more context states.

25 Claims, 7 Drawing Sheets

(56) References Cited

U.S. PATENT DOCUMENTS

2016/0371082 A1* 12/2016 Yudanov ............... G06F 9/461
2018/0144435 A1   5/2018 Chen et al.
2018/0165092 A1   6/2018 Du et al.

OTHER PUBLICATIONS

Ashutosh P., et al., "Opportunistic Computing in GPU Architectures", ACM/IEEE 46th Annual International Symposium On Computer Architecture, Jun. 22, 2019 (Jun. 22, 2019), pp. 210-223, XP033704291, [retrieved on Feb. 3, 2020] p. 211, left-hand column, paragraph 2—p. 212, left-hand column, paragraph 2.
International Search Report and Written Opinion—PCT/US2020/039887—ISA/EPO—dated Sep. 21, 2020.
Lebeane M., et al., "ComP-Net: Command Processor Networking for Efficient Intra-Kernel Communications on GPUs", Parallel Architectures and Compilation Techniques, ACM, New York, USA, Nov. 1, 2018 (Nov. 1, 2018), 13 pages, XP058418102, p. 4, left-hand column, paragraph 1—paragraph 3 p. 6, left-hand column, paragraph 3—p. 7, left-hand column, paragraph 2; figure 6.

* cited by examiner

METHODS AND APPARATUS FOR WAVE SLOT MANAGEMENT

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU). In some aspects, the apparatus can determine one or more context states of at least one context register in each of multiple wave slots. The apparatus can also send information corresponding to the one or more context states in one of the multiple wave slots to a context queue. Additionally, the apparatus can convert the information corresponding to the one or more context states to context information compatible with the context queue. The apparatus can also store the context information compatible with the context queue in the context queue. In some aspects, the apparatus can remove the one or more context states of at least one context register from the one of the wave slots when the information corresponding to the one or more context states is sent to the context queue. In further aspects, the apparatus can send the context information compatible with the context queue to one of the multiple wave slots. Moreover, the apparatus can convert the context information compatible with the context queue to the information corresponding to the one or more context states. The apparatus can also copy the information corresponding to the one or more context states when the information corresponding to the one or more context states is sent to the context queue. In some aspects, the apparatus can also convert the multiple wave slots to multiple execution slots. Further, the apparatus can send wave data corresponding to the one of the wave slots to one of multiple execution units. The apparatus can also receive wave data corresponding to the one of the multiple wave slots from one of multiple execution units.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
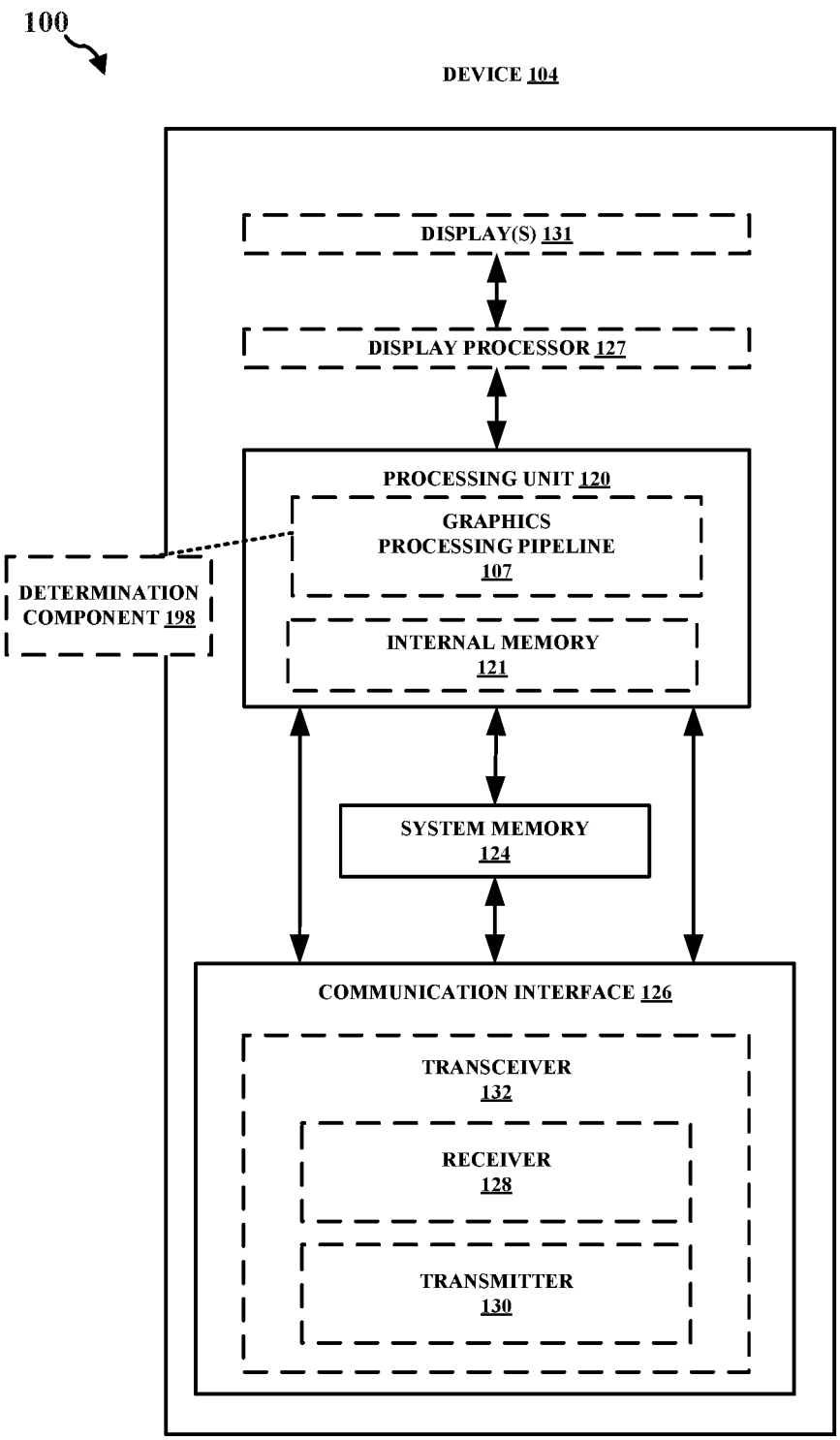
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine one or more context states of at least one context register in each of multiple wave slots. The determination component 198 can also be configured to send information corresponding to the one or more context states in one of the multiple wave slots to a context queue. Additionally, the determination component 198 can be configured to convert the information corresponding to the one or more context states to context information compatible with the context queue. The determination component 198 can also be configured to store the context information compatible with the context queue in the context queue. In some aspects, the determination component 198 can be configured to remove the one or more context states of at least one context register from the one of the wave slots when the information corresponding to the one or more context states is sent to the context queue. In further aspects, the determination component 198 can be configured to send the context information compatible with the context queue to one of the multiple wave slots. Moreover, the determination component 198 can be configured to convert the context information compatible with the context queue to the information corresponding to the one or more context states. The determination component 198 can also be configured to copy the information corresponding to the one or more context states when the information corresponding to the one or more context states is sent to the context queue. In some aspects, the determination component 198 can also be configured to convert the multiple wave slots to multiple execution slots. Further, the determination component 198 can be configured to send wave data corresponding to the one of the wave slots to one of multiple execution units. The determination component 198 can also be configured to receive wave data corresponding to the one of the multiple wave slots from one of multiple execution units.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
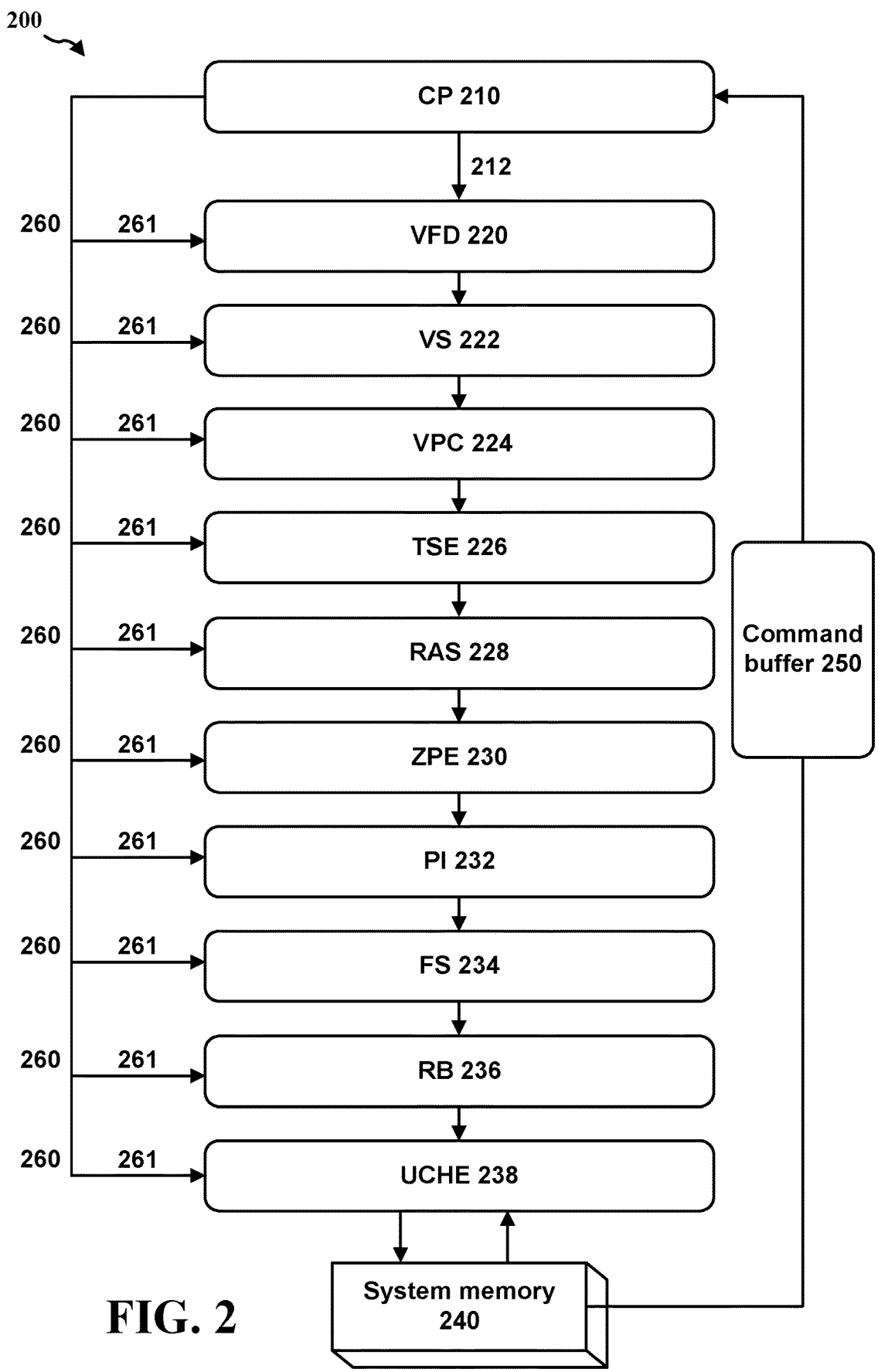
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

In some aspects, for each GPU processing unit or block, a context register may need to be prepared before any draw call data can be processed. As context registers and draw calls can be serialized, it can be helpful to have an extra context register prepared before the next draw call. In some instances, draw calls of the next context can be fed through the GPU data pipeline in order to hide context register programming latency. Further, when a GPU is equipped with multiple sets of context registers, each processing unit can have sufficient context switching capacity to manage smooth context processing. In turn, this can enable the GPU to cover pipeline latency that can result from unpredictable memory access latency and/or extended processing pipeline latency.

Figure 3:
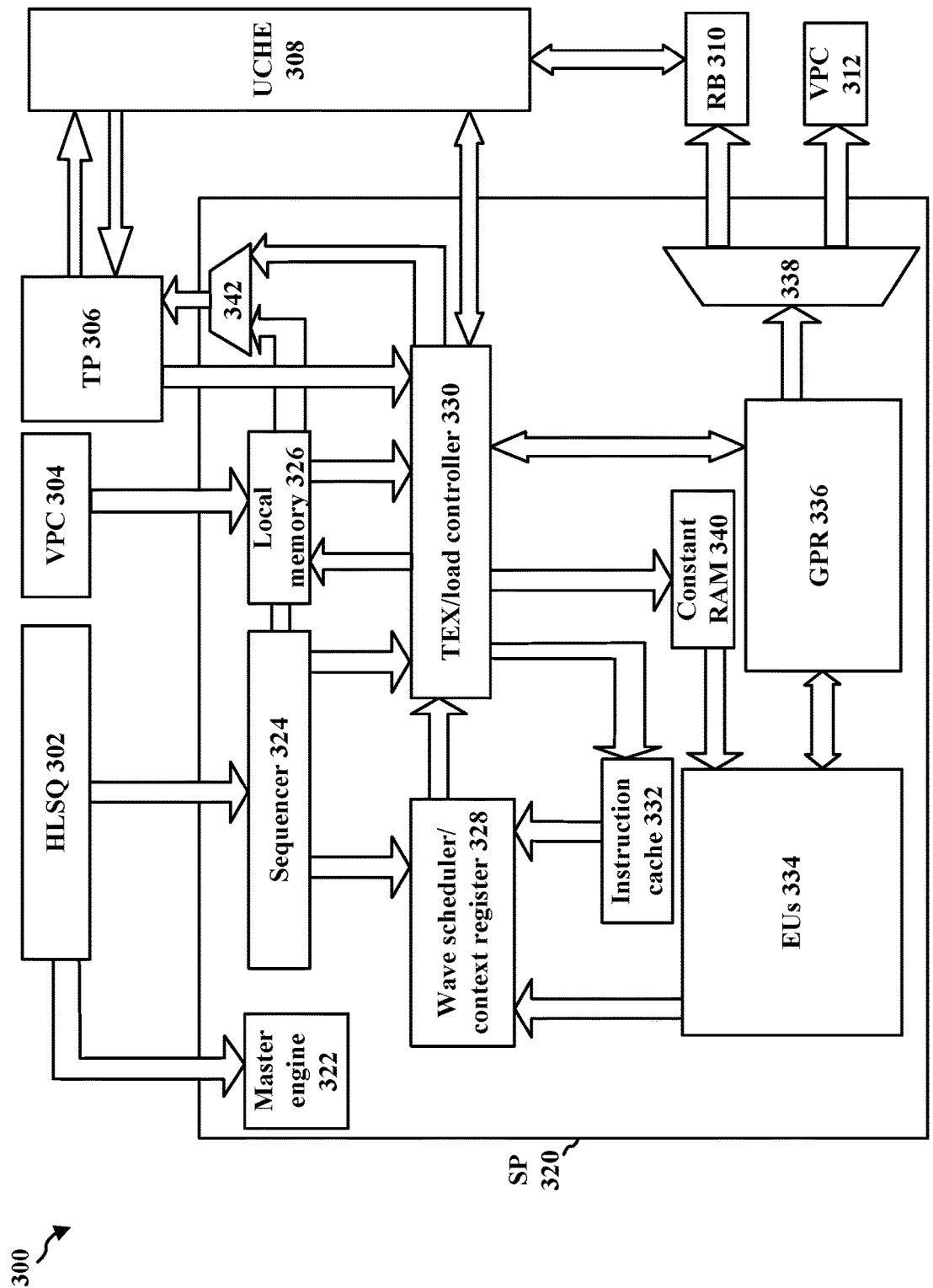
FIG. 3 illustrates an example GPU in accordance with one or more techniques of this disclosure.

FIG. 3 illustrates an example GPU 300 in accordance with one or more techniques of this disclosure. More specifically, FIG. 3 illustrates a streaming processor (SP) system in GPU 300. As shown in FIG. 3, GPU 300 includes high level sequencer (HLSQ) 302, VPC 304, thread processor (TP) 306, UCHE 308, RB 310, and VPC 312. GPU 300 also includes SP 320, master engine 322, sequencer 324, local memory 326, wave scheduler and context register 328, texture unit (TEX) or load controller 330, instruction cache 332, execution units (EUs) 334, general purpose register (GPR) 336, distributor 338, constant RAM 340, and distributor 342. The wave scheduler and context register 328 can also include one or more wave slots.

As shown in FIG. 3, the SP 320 can include traditional function units or blocks, e.g., EUs 334 or sequencer 324. EUs 334 can execute or process some of the desired functions of the GPU. The sequencer 324 can allocate resources and local memory, as well as store local memory. Also, the sequencer 324 can allocate wave slots and any associated GPR 336 space. For example, the sequencer 324 can allocate wave slots or GPR 336 space when the HLSQ 302 issues a pixel tile workload to the SP 320. In some aspects, the wave scheduler 328 can execute a pixel shader or issue instructions to the EUs 334. The EUs 334 can also include an arithmetic logic unit (ALU) and/or an elementary function unit (EFU). Further, the TEX or load controller 330 can be considered an execution unit.

Additionally, the TEX or load controller 330 can correspond to one or multiple units. For instance, the TEX 330 can perform a texture fetch and/or the load controller 330 can perform a memory fetch. In some aspects, the instruction cache 332 can store a workload or program to be executed. Also, the constant RAM 340 can store the constant that is needed for a constant or uniform formation. As further shown in FIG. 3, the SP 320 can interface with the outside blocks, e.g., HLSQ 302, VPC 304, TP 306, UCHE 308, RB 310, and VPC 312. These blocks 302-312 can utilize user provided input and/or the SP can output results to these blocks or memory access.

As shown in FIG. 3, each unit or block in GPU 300 can send data or information to other blocks. For instance, HLSQ 302 can send commands to the master engine 322. Also, HLSQ 302 can send vertex threads, vertex attributes, pixel threads, and/or pixel attributes to the sequencer 324. VPC 304 can send certain coefficients to local memory 326. TP 306 can send texture data to the TEX 330. TP 306 can also receive texture requests from TEX 330, e.g., via distributor 342, and bypass requests from local memory 326. Further, TP 306 can send requests to and receive texture elements (texels) from UCHE 308. UCHE 308 can also send memory to and receive memory from TEX 330, as well as send memory to and receive memory from RB 310. Also, RB 310 can receive an output in the form of color from GPR 336, e.g., via distributor 338. VPC 312 can also receive output in the form of vertices from GPR 336, e.g., via distributor 338. GPR 336 can also send temporary data to and receive temporary data from EUs 334. Moreover, EUs 334 can send address or predicate information to the wave scheduler 328, as well as receive constant data from constant RAM 340. TEX or load controller 330 can also send/receive load or store data to/from GPR 336, as well as send store data to and receive load data from local memory 326. Further, TEX or load controller 330 can send global data to constant RAM 340 and update information to the instruction cache 332. TEX or load controller 330 can also receive attribute data from sequencer 324 and synchronization information from wave scheduler 328. Additionally, wave scheduler 328 can receive decode information from instruction cache 332 and thread data from sequencer 324.

As mentioned above, the GPU 300 can process workloads, e.g., a pixel or vertex workload. In some aspects, these workloads can correspond to, or be referred to as, waves or wave formations. For instance, each workload or operation can use a group of vertices or pixels as a wave. For example, each wave can include a number of different components to perform a workload or operation, e.g., 64 or 128 components. In some instances, GPU 300 can send a wave formation, e.g., a pixel or vertex workload, to the wave scheduler 328 for execution. For a vertex workload, the GPU can perform a vertex transformation. For a pixel workload, the GPU can perform a pixel shading or lighting.

As indicated above, each of the aforementioned processes or workloads, e.g., the processes or workloads in the SP 320, can include a wave formation. For example, during a vertex workload, a number of vertices, e.g., three vertices, can form a triangle or primitive. The GPU can then perform a transformation of these vertices, such that the vertices can transform into a wave. In order to perform this transformation, GPUs can utilize a number of a wave slots, e.g., to help transform the vertices into a wave. Further, in order to execute a workload or program, the GPU can also allocate the GPR space, e.g., including a temporary register to store any temporary data. Additionally, the sequencer 324 can allocate the GPR 336 space and one or more wave slots in order to execute a wave. For example, the GPR 336 space and one or more wave slots can be allocated when a pixel or vertex workload are issued.

In some aspects, the wave scheduler 328 can process a pixel workload and/or issue instructions to various execution units, e.g., EUs 334. The wave scheduler 328 can also help to ensure data dependency between instructions, e.g., data dependency between ALU operands due to the pipeline latency and/or texture sample return data dependency based on a synchronization mechanism. Additionally, the wave scheduler 328 can have a load reference counter (LRC) to count outstanding texture or memory requests that are issued to the TP 306 or UCHE 308, as well as a corresponding data return request. In some aspects, if the LRC value is greater than zero, this can indicate there is outstanding data. As such, instructions that are dependent on the return of the outstanding data may not be able to execute until the LRC value decreases to zero.

As mentioned above, GPUs can experience memory or pipeline latency when processing various instructions. In some aspects, latency can be categorized based on data dependency that occurs within or outside of the SP. For instance, data dependency that occurs within the SP, i.e., SP internal data dependency, can be data dependency between ALUs or between an EFU and an ALU. This type of latency can be relatively short compared to other memory latency, e.g., less than 20 processing cycles. Additionally, data dependency that occurs outside the SP, i.e., SP external data dependency, can be data dependency based on texture sample or memory return data. This type of latency can be relatively long compared to other memory latency, e.g., greater than 200 processing cycles. As the SP internal data latency is relatively short compared to other memory latency, it can account for internal data latency and/or enable a high efficiency parallel EU execution with a low number of wave slots, e.g., four to six wave slots. However, for longer SP external data latency, the number of wave slots needed to account for the latency can be larger, e.g., 24 to 32 wave slots.

In some aspects, GPUs can experience memory or pipeline latency when a wave instruction is issued. In order to account for this latency, GPUs may issue more instructions, e.g., texture sample instructions, to ensure that the pipeline is fully utilized. Additionally, the processing time for a group of pixels may depend on the throughput. For example, a group pixels may take a number of cycles, e.g., 32 cycles, to process. In some instances, the memory latency can be greater than this amount of cycles, e.g., up to 100 cycles. As a result, the data may return from processing even more cycles after this, e.g., 200 cycles later. Accordingly, processing a group pixels, e.g., 128 pixels, may not be sufficient to cover the pipeline latency. Further, the SP capacity to process more pixel tiles, as well as more texture sample instructions, can be limited by the amount of wave slots and/or GPR size. For instance, if there is one wave slot, then GPUs may have to wait for the data to process and cycle through the system before processing the next wave. In some aspects, a GPU can accept new pixels to form another wave, but the GPU may have to wait to fill the pipeline to account for the latency.

In order to account for increased pipeline latency, aspects of the present disclosure may increase the amount of wave slots. For example, for the waves to be processed at the same time, i.e., processed in parallel, aspects of the present disclosure may need a certain amount of wave slots, e.g., four, eight, or 16 wave slots. When adding wave slots, aspects of the present disclosure may also need additional GPR space to account for the processing completion time. Accordingly, the amount of wave slots and GPR space can be important resources to allow for more waves to process simultaneously, e.g., in order to account for pipeline latency. So aspects of the present disclosure may utilize an increased number of wave slots in order to allow the waves to be processed simultaneously or in parallel.

In order to increase the wave processing capacity of the system, or the ability to cover pipeline latency, GPUs may include an increased number of wave slots. However, one problem with increasing the amount of wave slots and/or GPR size is that both resources are expensive. For example, GPUs may need information, e.g., the number of pixels, or instructions in order to execute a wave at a wave slot, such that each additional wave slot increases the system operation cost. Further, wave slots can log the information for the wave execution status, so the system can proceed with the wave processing, which can also increase operation costs. Additionally, in order to increase the amount of wave slots, GPUs may need to increase the corresponding storage space for the wave slots. For example, in order to double the wave slot capacity, GPUs may need to double the size of the storage. As such, increasing the amount of wave slots can increase both the operation cost and the amount of required storage space.

Figure 4:
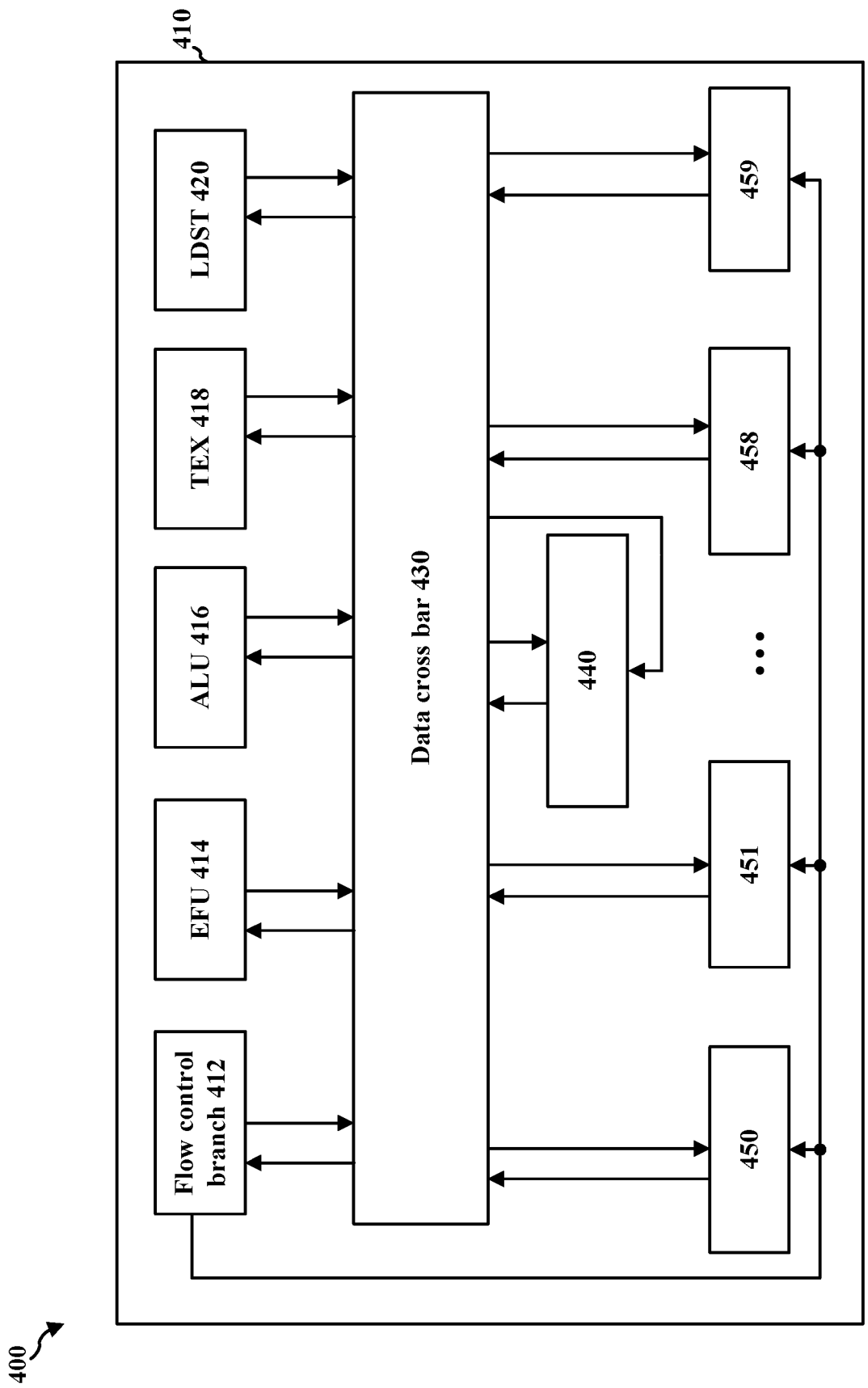
FIG. 4 illustrates an example GPU in accordance with one or more techniques of this disclosure.

FIG. 4 illustrates an example GPU 400 in accordance with one or more techniques of this disclosure. More specifically, FIG. 4 illustrates components or units within SP 410 in GPU 400. As shown in FIG. 4, GPU 400 includes a number of execution units, e.g., flow control branch 412, EFU 414, ALU 416, TEX 418, and load store (LDST) 420. GPU 400 can include a number of additional execution units, as execution units 412-420 are merely an example and any combination or order of execution units can be used by GPUs herein. GPU 400 can also include data cross bar 430, which can also be referred to as multiple thread manager 430, as well as level zero (L0) cache 440. Further, GPU 400 includes a number of wave slots, e.g., wave slots 450-459. For ease of illustration, wave slots 452-457 are not shown in FIG. 4. GPU 400 can include any number of different wave slots, as wave slots 450-459 are merely an example. In some aspects, wave slots 450-459 can be part of a wave scheduler.

As shown in FIG. 4, each component in GPU 400 can communicate with a number of other components. For instance, each of the execution units 412-420 can send or receive data or instructions, e.g., requests or grants, to/from the data cross bar 430. Also, each of the wave slots 450-459 can send or receive data or instructions, e.g., requests or grants, to/from the data cross bar 430. Further, data cross bar 430 can store data in, or receive data from, the L0 cache 440. Each of the execution units 412-420, e.g., flow control branch 412, EFU 414, ALU 416, TEX 418, and LDST 420, can also send or receive data or instructions to/from the wave slots 450-459. In some aspects, each of the wave slots 450-459 can issue instructions simultaneously to each of the execution units 412-420.

FIG. 4 illustrates that GPU 400 includes ten wave slots 450-459. In some aspects, the wave slots 450-459 can be referred to as flat wave slots, as each of the wave slots 450-459 can execute wave instructions on an individual basis without regard for the other wave slots. When an individual wave instruction is processing through the system, the corresponding wave slot can wait for the wave instruction to return, i.e., the wave slot can be in standby mode. Additionally, the context registers used in the wave slot logic can control wave execution and be flop-based, such as to enable switching between wave slots in order to access different EUs. As such, these context registers may need updating frequently. Also, as discussed previously, increasing the number of wave slots can be expensive.

In some aspects, increasing the number of wave slots can utilize a cross bar with an increased scaling ability between the wave slots and the execution units, which may cause a number of problems, e.g., clock speed degradation and/or wire congestion in the design. For example, in GPU 400, data cross bar 430 may need an increased scaling ability to increase the number of wave slots 450-459, which may result in a larger data cross bar 430 and wire congestion or clock speed degradation. For example, GPU 400 includes ten wave slots 450-459 and five execution units 412-420, so the data cross bar 430 helps to convert and manage this ten-to-five wave slot to execution unit ratio. Accordingly, the data cross bar 430 can convert the ten wave slot instructions to the five execution units. So the data cross bar 430 can scale two wave instructions for every one execution unit. In order to double the amount of wave slots 450-459, e.g., from 10 to 20 wave slots, then data cross bar 430 may need to be adjusted to access and manage the execution units 412-420. Accordingly, if the number of wave slots is increased to 20, then the data cross bar 430 may need to be adjusted to convert 20 wave slot instructions to the five execution units. However, as mentioned above, adjusting the cross bar can incur a number of utilization issues, e.g., wire congestions and clock speed degradation. Indeed, the space around the execution units may be limited, so there may not be enough room for an increased amount of wire. For example, if the number of wave slots is doubled, the amount of wire may also double, but the size of the space remains the same, so the GPU may experience a wire congestion issue. Accordingly, there is a need for increasing the wave slot capacity without experiencing the aforementioned issues.

As mentioned above, in some aspects, some wave slots may not be actively issuing wave instructions. For example, out of ten wave slots, there may be four to six wave slots that are waiting on external wave data to be processed, e.g., after issuing a data fetch instruction. These wave slots may not be executing instructions nor updating a context register, i.e., these wave slots are in standby mode. Because these standby wave slots may not need updates to a corresponding context register, it may be possible to use another form of memory to store the context register information of wave slots in standby mode. One form of memory that may be cheaper than the flopped-based storage at wave slots is RAM memory. For example, flopped-based memory storage may be three times more expensive than RAM-based memory. Accordingly, a context queue, as described herein, can be stored in RAM memory which is cheaper than flopped-based memory.

As mentioned above, increasing the number of wave slots may mitigate memory or pipeline latency issues. For instance, as latency issues increase, the amount of data or instructions to account for the latency may likewise increase. In order to increase the wave processing capacity, or the ability to cover pipeline latency, the number of wave slots can also be increased. In some aspects, once a wave slot issues an instruction, it can wait for the instruction to be processed, i.e., remain in standby mode. The aforementioned latency issues may cause the wave slot to wait in standby mode longer than usual. As wave slots are valuable resources, it can be a waste of resources if wave slots are in standby mode waiting on return data. In some aspects, wave slots may even be idle or in standby mode a majority of the time. Accordingly, this may not be an efficient way to implement the wave slot resources.

In order to address the aforementioned wave slot issues, aspects of the present disclosure can take information, e.g., context information, from wave slots that would otherwise be in standby mode and store it in a data or context queue and/or RAM-based storage. By doing so, the idle wave slots can be utilized for executing another wave instruction while waiting on the previous wave data to be processed. Once the wave data is processed and returns to the wave slots, the context information corresponding to the wave data can be sent to one of the wave slots. Additionally, in some aspects, instead of using flat wave slots, e.g., which may store context information unnecessarily while in standby mode, aspects of the present disclosure can use a type of wave slot, which can be referred to as execution slots, that can send the context information to a data or context queue while waiting on wave information to be processed. In some aspects, an execution slot is a type of wave slot that can execute other wave instructions while a previously executed wave instruction is being processed. Accordingly, in some aspects, an execution slot can allow a GPU to execute more wave instructions compared to a typical wave slot. By utilizing execution slots, aspects of the present disclosure may utilize a reduced amount of execution slots in order to execute a similar amount of wave instructions compared to traditional wave slots. Further, aspects of the present disclosure can build a hierarchical wave slot structure, e.g., with execution slots and a data or context queue to store context information for wave data being processed. In some aspects, these wave slots can be referred to as execution slots, execution wave slots, execution-based wave slots, or any similar phrase. For example, aspects of the present disclosure can perform at the same efficiency level by using a reduced amount of execution slots compared to wave slots. By utilizing execution slots, aspects of the present disclosure can utilize a reduced amount of wave slots, e.g., six execution slots compared to ten wave slots, and maintain the same efficiency level. Additionally, aspects of the present disclosure can include a RAM-based data or context queue to store context information for wave slots that previously executed wave instructions. Aspects of the present disclosure can introduce a hierarchy wave queue, such that wave slots that would otherwise be idle can be used to execute wave data that returns from processing. In turn, this can be an efficient way to increase the wave slot capacity to account for latency issues.

In some aspects, when processing units, e.g., GPUs, herein execute a wave instruction that has finished processing, aspects of the present disclosure can send the context information corresponding to the wave instruction that was stored in the context queue to one of the wave or execution slots. By doing so, the wave or execution slot can execute the wave instruction with the corresponding context information. After performing this wave instruction, e.g., generating coordinates or vertices for a triangle or primitive, aspects of the present disclosure can send the context information for the next wave instruction to one of the wave slots from the context queue. Additionally, by utilizing a reduced number of wave or execution slots, e.g., six execution slots compared to ten wave slots, aspects of the present disclosure can still have enough wave slots to cover instructions for up to six execution units at the same time, which is enough to cover the five execution units illustrated in FIG. 4. In some aspects, there may be at least the same amount of wave or execution slots as execution units. Also, based on the hierarchy wave structure where idle wave slots are utilized to execute incoming wave instructions, the wave or execution slots may not remain inactive for many cycles after they send a corresponding wave instruction to cycle through the system. Accordingly, aspects of the present disclosure can utilize a reduced number of wave of execution slots, and correspondingly reduce the amount of wasted wave slot resources, e.g., as fewer wave slots will be waiting on wave instructions to be processed. As such, aspects of the present disclosure can partition or convert a group of individually functioning wave slots into a more efficient group of hierarchy based wave slots.

In some instances, aspects of the present disclosure can maintain the existing implementation and functionality of the previous flat-based wave slots, but when a wave slot would otherwise be in standby mode waiting for a corresponding wave instruction to be processed, the wave slot can become available to execute other wave instructions. As such, the wave slot can access the context queue for context information corresponding to any incoming wave instruction. By doing so, aspects of the present disclosure can optimize the performance of the wave slots. As mentioned previously, the context queue can utilize RAM-based memory to store the context information of wave slots. In some aspects, the context queue may assign some types of RAM-based memory to certain ports or slots in the context queue.

In some aspects, when a corresponding wave instruction is being processed, a wave or execution slot can copy the corresponding context register information to the RAM-based memory in the context queue. The wave slot can also temporarily surrender its ability to execute the corresponding wave instruction, and gain the ability to execute another wave instruction. By doing so, the wave slot will not be occupied while waiting for the corresponding wave instruction to be processed, e.g., at an execution unit. In this sense, the wave slot is no longer in a standby state, as it is capable of executing another wave instruction. Accordingly, aspects of the present disclosure can copy or convert the context register information associated with a particular wave instruction to the data or context queue and free up the wave slot for other wave execution during the time the wave slot would otherwise be waiting for the wave instruction to be processed. Further, when the wave instruction returns from processing, aspects of the present disclosure can copy the context data from the context queue to one of the wave or execution slots to continue executing the wave instruction.

As indicated above, aspects of the present disclosure can utilize a hierarchy-based data access procedure to copy and/or save context information into the context queue, e.g., with RAM-based memory storage. GPUs herein can also optimize the execution capability of wave slots that would otherwise be in an idle or standby state. Moreover, aspects of the present disclosure can utilize a reduced number of wave or execution slots while still optimizing or maintaining the same execution capability of these wave or execution slots. In some aspects, aspects of the present disclosure can utilize a reduced number of wave slots, e.g., six execution slots compared to ten wave slots, and/or utilize more efficient wave or execution slots while maintaining the same level of efficiency. Accordingly, the wave slots can execute more wave data and no longer be in an idle state waiting on wave data to be processed. For instance, if a wave slot is not being utilized to execute data, then aspects of the present disclosure can store the context register information of the wave slot in a context queue. In some instances, the context information for each wave instruction that is waiting to be executed may be stored in the context queue.

As indicated herein, aspects of the present disclosure can convert wave slots into a wave slot hierarchy. Further, aspects of the present disclosure can partition the wave slots into a hierarchy of different levels. For example, a first level of the hierarchy can be the wave slots, each of which can be accessed in parallel or at the same time as other wave slots. The second level of the hierarchy can be the context queue, which can track the wave instructions that are being processed, e.g., by execution units. As the data or wave instructions are processed and cycle back sequentially, the context information stored in the context queue can be copied and sent to the wave or execution slots.

As indicated above, the wave hierarchy can optimize the execution capability of the wave slots, such that idle or standby time at each wave slot is minimized. Aspects of the present disclosure could allow for the reduction of the ratio of wave slots to execution units, e.g., from a ratio of ten-to-five to a ratio of six-to-five. Aspects of the present disclosure can also introduce a data cross bar for the transfer or conversion of context information from the wave slots to the context queue. In some aspects, the size of this data cross bar may not be very large compared to other data cross bars, as the conversion of context information from the wave slots to the context queue does not have a high throughput. Additionally, this wave hierarchy can reduce the size of other data cross bars, as the number of wave slots can be reduced.

As indicated herein, the aforementioned wave hierarchy can send context information from the wave slots to a context queue, store context information in the context queue, and then send the context information back to the wave slots when it is ready to be executed. Accordingly, in some aspects, this can be a first-in-first-out (FIFO) hierarchy of wave data. By forming this wave hierarchy, aspects of the present disclosure can address the aforementioned congestion problems. For instance, aspects of the present disclosure can increase the capacity of each wave slot, so that each wave slot can execute more wave instructions and better account for any latency issues. Further, aspects of the present disclosure can allow for the reduction of the wave instruction ratio between the wave slots and the execution units, while still maintaining the same amount of functionality or execution ability.

Figure 5A:
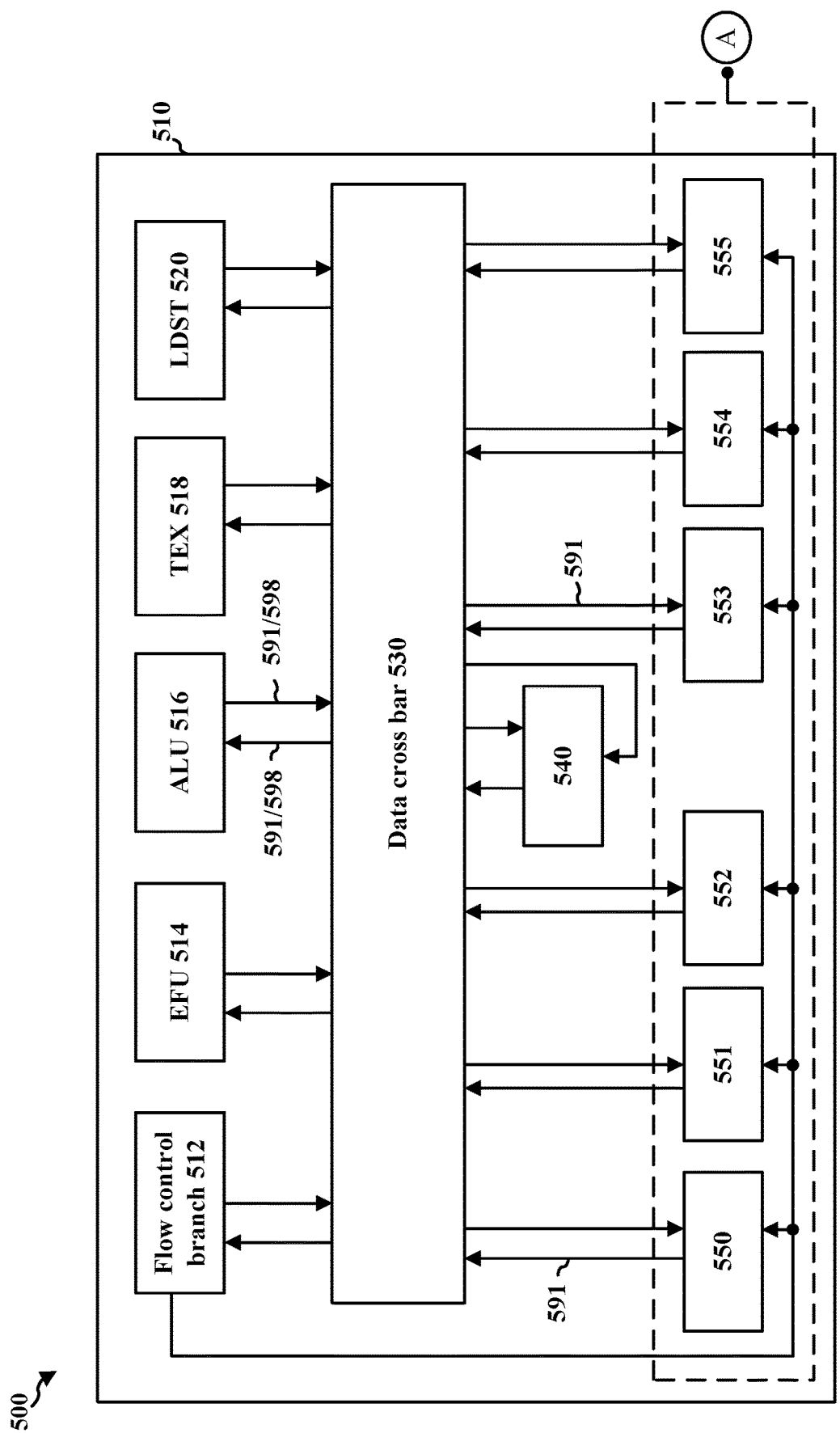
FIGS. 5A and 5B illustrate an example GPU in accordance with one or more techniques of this disclosure.
Figure 5B:
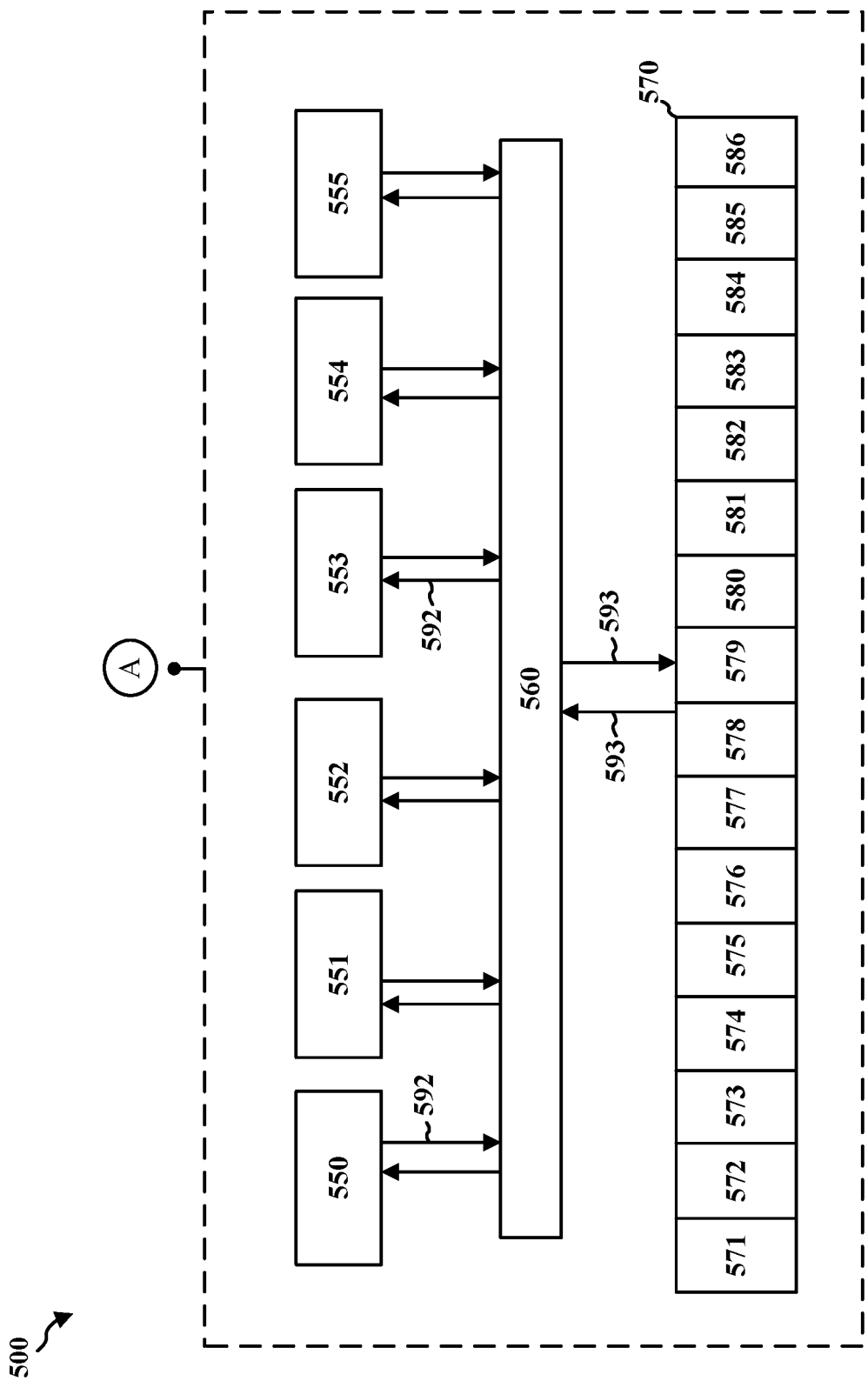

FIGS. 5A and 5B illustrate an example GPU 500 in accordance with one or more techniques of this disclosure. More specifically, FIGS. 5A and 5B show components or units within SP 510 in GPU 500. As shown in FIGS. 5A and 5B, GPU 500 includes a number of execution units, e.g., flow control branch 512, EFU 514, ALU 516, TEX 518, and LDST 520. GPU 500 can also include a number of additional execution units, as execution units 512-520 are merely an example and any combination or order of execution units can be used by processing units, e.g., GPUs, herein. GPU 500 can also include data cross bar 530, which can also be referred to as multiple thread manager 530, as well as L0 cache 540. Further, GPU 500 includes a number of wave slots, e.g., wave slots 550-555. GPU 500 can include any number of different wave slots, as wave slots 550-555 are merely an example. Additionally, wave slots 550-555 can be part of a wave scheduler.

As illustrated in FIG. 5B, GPU 500 can also include data cross bar 560 and context queue 570, which includes context queue slots 571-586. FIG. 5B can be an extension of FIG. 5A, as shown using extension point A. For example, GPU 500 in FIG. 5A is the same as GPU 500 in FIG. 5B, where FIG. 5B is a more detailed close-up view of the dashed line section of GPU 500. FIG. 5B was added for ease of illustration to show the detail surrounding wave slots 550-555, e.g., data cross bar 560 and context queue 570 including context queue slots 571-586.

As shown in FIGS. 5A and 5B, each component in GPU 500 can communicate with a number of other components. For example, each of the execution units 512-520 can send or receive data or instructions, e.g., requests or grants, to/from the data cross bar 530. Further, each of the wave slots 550-555 can send or receive data or instructions, e.g., requests or grants, to/from the data cross bar 530. Also, data cross bar 530 can store data in, or receive data from, the L0 cache 540. Each of the execution units 512-520, e.g., flow control branch 512, EFU 514, ALU 516, TEX 518, and LDST 520, can also send or receive data or instructions to/from the wave slots 550-555. In some aspects, each of the wave slots 550-555 can issue instructions simultaneously to each of the execution units 512-520. Additionally, each of the wave slots 550-555 can send or receive data or instructions, e.g., requests or grants, to/from the data cross bar 560. Moreover, data cross bar 560 can send or receive data or instructions, e.g., requests or grants, to/from the context queue 570. Each of the wave slots 550-555 can also send or receive data or instructions to/from the context queue 570.

FIGS. 5A and 5B illustrate that GPU 500 includes six wave slots, e.g., wave slots 550-555. In some aspects, the wave slots 550-555 can be referred to as execution slots 550-555. As mentioned above, each of the wave slots 550-555 can execute wave instructions on a hierarchical basis with the group of wave slots. For instance, when an individual wave instruction is processing through the system, the corresponding wave slot may not need to wait for the particular wave instruction to return from being processed, e.g., at one of the execution units 512-520. Rather than being in idle or standby mode waiting for a wave instruction to return from being processed, each of the wave slots 550-555 may execute another wave instruction.

Additionally, when an individual wave instruction is processing through the system, e.g., at one of execution units 512-520, the context information for the corresponding wave slot, e.g., one of wave slots 550-555, can be sent to the context queue 570, e.g., via the data cross bar 560. This context information can be stored in the context queue 570, e.g., in one of the context queue slots 571-586. When the corresponding wave instruction is finished processing, e.g., at one of the execution units 512-520, the context information can be sent from the context queue 570, e.g., via the data cross bar 560, to one of the wave slots 550-555 to be executed. The data cross bar 560 can convert the context information from one of the wave slots 550-555 being sent to the context queue 570 into context information compatible with the context queue 570. Likewise, the data cross bar 560 can convert the context information compatible with the context queue 570 being sent to the wave slots 550-555 into context information that is compatible with the wave slots 550-555.

As mentioned herein, aspects of the present disclosure can replace flat-based wave slots with a wave hierarchy structure, e.g., execution slots 550-555, data cross bar 560, and context queue 570. In order to do so, aspects of the present disclosure can copy and/or send the context register information for certain execution slots 550-555 to the context queue 570. For example, execution slot 550 may have a certain context value when a corresponding wave instruction is sent to an execution unit to be processed. GPU 500 can then copy and send that context value to the context queue 570, and then copy and send the context value back to one of the execution slots 550-555 when the wave instruction is finished processing. There is no need for the context value to be sent back to execution slot 550, as any one of the execution slots 550-555 is capable of executing the wave instruction with the context information. As any of the execution slots 550-555 is capable of execution a wave instruction with context information, a reduced amount of wave slots can be utilized while maintaining the same level of efficiency, e.g., utilizing six execution slots compared to ten wave slots.

Aspects of the present disclosure can execute a number of wave instructions, e.g., an ALU instruction. For example, an ALU instruction can go through multiple processing steps: 1) interpretation, 2) texture sampling pre-processing, 3) waiting for the texture sampling to return from processing, 4) post-processing. Some example waiting times using flat-based wave slots are: texture sampling pre-processing=10 cycles, waiting for the texture sampling to return from processing=200 cycles, post-processing=10 cycles. Accordingly, using flat-based wave slots, a wave slot can be waiting for 200 cycles out of 220 cycles and executing for 20 cycles. By utilizing the execution slots mentioned herein with a hierarchical wave structure, the context information can be stored in the context queue. In turn, this can open up the execution slot for executing another wave instruction and improve utilization of the execution slots in the 200 cycles that would otherwise be wasted. Accordingly, the wave slots herein can process an increased amount of wave instructions, e.g., ten times more wave instructions, as the wave slots are no longer wasting time waiting. Indeed, because the wave slots in the present disclosure are more efficient, aspects of the present disclosure can operate as efficiently with fewer wave slots, e.g., GPUs that use the techniques herein can operate with 6 wave slots as efficiently as GPUs with 10 wave slots.

Some aspects of the present disclosure can include a number of wave slots that are greater than or equal to the number of execution units, in order to fill or utilize each of the execution units. In some aspects, processing units, e.g., GPUs, herein can have fewer wave slots than execution units, as long as the execution units that are the busiest, e.g., ALU 516 or TEX 518, are generally filled or utilized. However, some processing units, e.g., GPUs, herein can have at least as many wave slots as execution units, so the utilization of the execution units can be optimized.

As shown in FIGS. 5A and 5B, GPU 500 can determine one or more context states of at least one context register in each of wave slots 550-555. GPU 500 can send wave data corresponding to one of the wave slots 550-555, e.g., wave data or instruction 591 corresponding to wave slot 550, to one of execution units 512-520, e.g., ALU 516. GPU 500 can also send information corresponding to the one or more context states in one of the wave slots, e.g., context state or information 592 corresponding to wave slot 550, to the context queue 570. In some aspects, the information corresponding to the one or more context states, e.g., context state or information 592, can be sent to the context queue 570 when the wave data corresponding to one of the wave slots, e.g., wave data or instruction 591 corresponding to wave slot 550, is sent to one of the execution units, e.g., ALU 516. Also, wave data or instruction 591 can be converted by data cross bar 530, so it can be referred to as wave data or instruction 598.

GPU 500 can also copy the information corresponding to the one or more context states in one of the wave slots when the information corresponding to the one or more context states, e.g., context state or information 592, is sent to the context queue 570. GPU 500 can also remove the one or more context states from one of the wave slots when the information corresponding to the one or more context states, e.g., context state or information 592, is sent to the context queue 570. Additionally, GPU 500 can convert the information corresponding to the one or more context states in one of the wave slots, e.g., context state or information 592, to context information compatible with the context queue 570, e.g., context state or information 593. GPU 500 can also store the context information compatible with the context queue 570, e.g., context state or information 593, in the context queue 570.

GPU 500 can also receive wave data corresponding to one of the wave slots, e.g., wave data 591, from one of the execution units, e.g., ALU 516. In some aspects, the context information compatible with the context queue 570, e.g., context state or information 593, can be sent to one of the wave slots when the wave data corresponding to one of the wave slots, e.g., wave data 591, is received from the one of the execution units, e.g., ALU 516. GPU 500 can also send the context information compatible with the context queue 570, e.g., context state or information 593, to one of the wave slots, e.g., wave slot 553. GPU 500 can also convert the context information compatible with the context queue 570, e.g., context state or information 593, to information corresponding to the one or more context states, e.g., context state or information 592, when sending the information to wave slot 553.

In some instances, wave slots 550-555 can be execution slots 550-555. GPU 500 can also replace wave slots 550-555 with execution slots and/or convert the wave slots 550-555 to execution slots. In some aspects, converting a wave slot to an execution slot can result in a particular wave slot being able to execute multiple wave instructions, e.g., after a previous wave instruction is executed. Moreover, the number of execution slots 550-555 can be less than or equal to the number of wave slots 550-555. In further aspects, the information corresponding to the one or more context states in one of the wave slots, e.g., context state or information 592, can be converted using data cross bar 560. GPU 500 can also store the information corresponding to the one or more context states of at least one context register in one of multiple wave slots, e.g., wave slots 550-555. Also, the multiple wave slots can be in a graphics processing pipeline of a GPU. In some aspects, the wave slots and the execution units can be in a SP, e.g., SP 510. Further, in some aspects, the number of wave slots 550-555 can be greater than or equal to the number of execution units 512-520.

As illustrated in FIGS. 5A and 5B, aspects of the present disclosure can include context queue 570 to store the context information of the wave slots 550-555. For example, context queue 570 can include 16 context queue slots 571-586. However the number of context queue slots can be scalable to include other amounts, e.g., 32 context queue slots. In some aspects, if wave slots 550-555 have pending wave data being processed, they can issue a request to acquire an execution slot with a wave identification (ID), which each context register can include. Further, upon granting the execution slot, a scheduler can copy active or frequently changed context registers from the context queue 570 to the granted execution slot in a few cycles, fetch the wave instruction, and then start executing the instruction. Additionally, if a wave or execution slot is in a waiting state, it can copy the active context register information to the context queue 570 in a few cycles and surrender its execution slot. In some aspects, if wave input data and/or output results are considered to be in a waiting state, they may not occupy wave or execution slots. Moreover, the context queue 570 can include a wide bandwidth for reduced latency issues. For example, latency may occur during wave instruction switching between the execution slots and the context queue.

As mentioned herein, aspects of the present disclosure can optimize the execution of wave instruction and/or context storage. For instance, aspects of the present disclosure can reduce the amount of space in a GPU, e.g., in SP 510, and/or reduce the cost of memory performance. As mentioned above, aspects of the present disclosure can include a data cross bar to help convert data from the execution slots to the context queue. Accordingly, the data cross bar can be considered a data conversion bar that converts the context data from the wave slots to the context queue. As mentioned above, aspects of the present disclosure can store and copy context information into a context queue when a wave slot is waiting on a wave instruction to return from processing. This can provide an efficient way to increase wave slot capacity to better account for latency and result in improved performance. Additionally, this can reduce the data cross bar size between the wave slots and execution units, which can mitigate congestion and/or clock speed degradation at the GPU.

Figure 6:
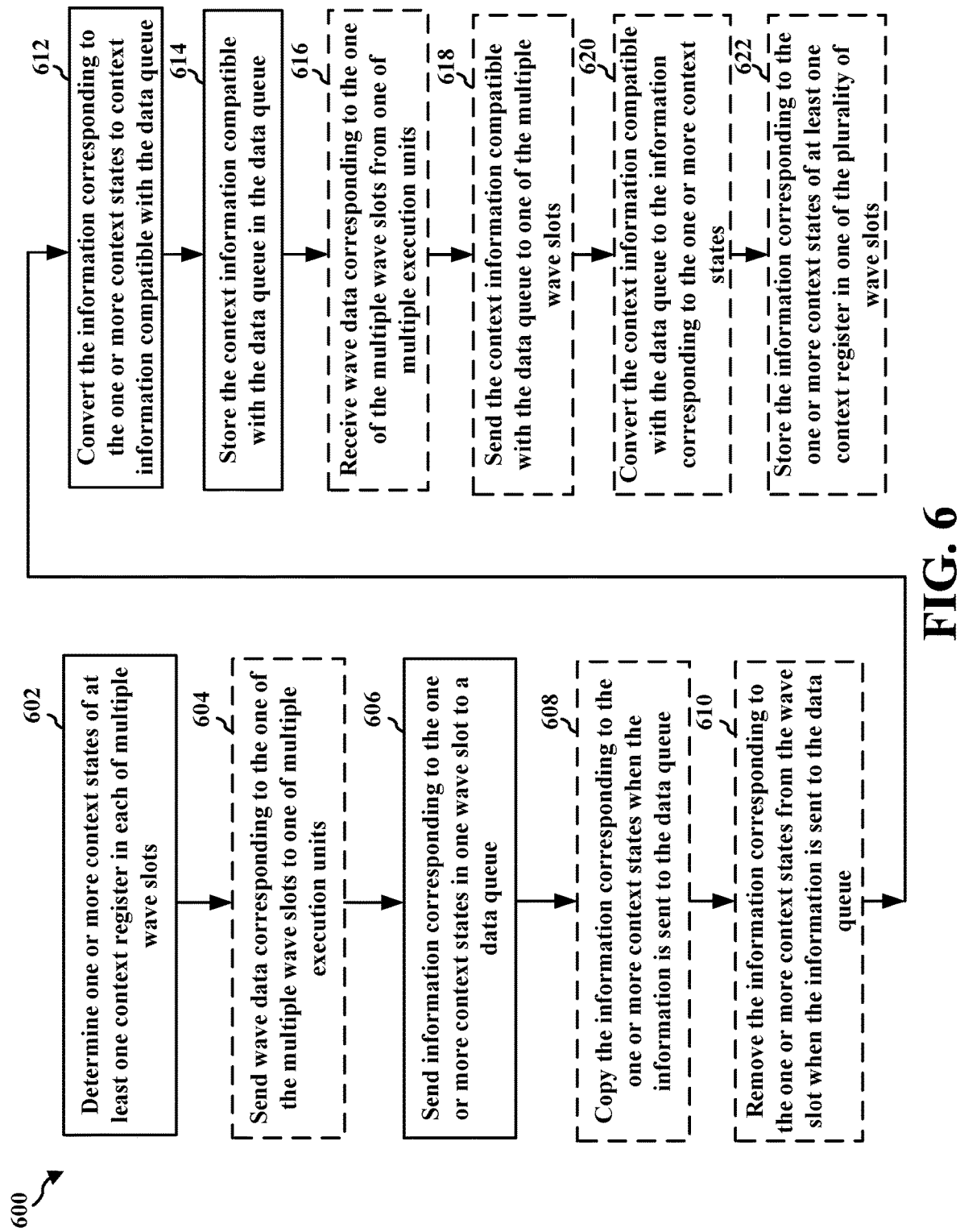
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by a GPU or apparatus for graphics processing. At 602, the apparatus can determine one or more context states of at least one context register in each of multiple wave slots, as described in connection with the examples in FIGS. 3, 4, 5A, and 5B. At 604, the apparatus can send wave data corresponding to the one of the multiple wave slots to one of multiple execution units, as described in connection with the examples in FIGS. 3, 4, 5A, and 5B. At 606, the apparatus can send information corresponding to the one or more context states of at least one context register in one of the multiple wave slots to a context queue, as described in connection with the examples in FIGS. 3, 4, 5A, and 5B. In some aspects, the information corresponding to the one or more context states of at least one context register can be sent to the context queue when the wave data corresponding to the one of the multiple wave slots is sent to one of the execution units, as described in connection with the examples in FIGS. 3, 4, 5A, and 5B.

At 608, the apparatus can copy the information corresponding to the one or more context states of at least one context register in one of the wave slots when the information corresponding to the one or more context states is sent to the context queue, as described in connection with the examples in FIGS. 3, 4, 5A, and 5B. At 610, the apparatus can remove the one or more context states of at least one context register from the one of the wave slots when the information corresponding to the one or more context states is sent to the context queue, as described in connection with the examples in FIGS. 3, 4, 5A, and 5B. At 612, the apparatus can convert the information corresponding to the one or more context states of at least one context register in one of the wave slots to context information compatible with the context queue, as described in connection with the examples in FIGS. 3, 4, 5A, and 5B. At 614, the apparatus can store the context information compatible with the context queue in the context queue, as described in connection with the examples in FIGS. 3, 4, 5A, and 5B.

At 616, the apparatus can receive wave data corresponding to the one of the wave slots from one of the execution units, as described in connection with the examples in FIGS. 3, 4, 5A, and 5B. In some aspects, the context information compatible with the context queue can be sent to one of the wave slots when the wave data corresponding to one of the wave slots is received from the one of the execution units, as described in connection with the examples in FIGS. 3, 4, 5A, and 5B. At 618, the apparatus can send the context information compatible with the context queue to one of the wave slots, as described in connection with the examples in FIGS. 3, 4, 5A, and 5B. At 620, the apparatus can convert the context information compatible with the context queue to the information corresponding to the one or more context states of at least one context register, as described in connection with the examples in FIGS. 3, 4, 5A, and 5B. At 622, the apparatus can store the information corresponding to the one or more context states of at least one context register in one of the wave slots, as described in connection with the examples in FIGS. 3, 4, 5A, and 5B.

In some aspects, the apparatus can replace the multiple wave slots with multiple execution slots and/or convert the multiple wave slots to multiple execution slots, as described in connection with the examples in FIGS. 3, 4, 5A, and 5B. As mentioned above, converting a wave slot to an execution slot can result in a particular wave slot being able to execute multiple wave instructions while a previously executed wave instruction is being processed. Moreover, the number of execution slots can be less than or equal to the number of wave slots, as described in connection with the examples in FIGS. 3, 4, 5A, and 5B. In further aspects, the information corresponding to the one or more context states of at least one context register in one of the wave slots can be converted using a data cross bar, as described in connection with the examples in FIGS. 3, 4, 5A, and 5B. Also, the multiple wave slots can be in a graphics processing pipeline of a GPU, as described in connection with the examples in FIGS. 3, 4, 5A, and 5B. In some aspects, the wave slots and the execution units can be in a streaming processor (SP), as described in connection with the examples in FIGS. 3, 4, 5A, and 5B. Further, in some aspects, the number of wave slots can be greater than or equal to the number of execution units, as described in connection with the examples in FIGS. 3, 4, 5A, and 5B.

In one configuration, a method or apparatus for graphics processing is provided. The apparatus may be a GPU or some other processor that can perform graphics processing. In one aspect, the apparatus may be the processing unit 120 within the device 104, or may be some other hardware within device 104 or another device. The apparatus may include means for determining one or more context states of at least one context register in each of multiple wave slots. The apparatus may also include means for sending, to a context queue, information corresponding to the one or more context states of at least one context register in one of the wave slots. Also, the apparatus may include means for converting the information corresponding to the one or more context states of at least one context register to context information compatible with the context queue. The apparatus may also include means for storing the context information compatible with the context queue in the context queue. Additionally, the apparatus can include means for removing the one or more context states of at least one context register from the one of the wave slots when the information corresponding to the one or more context states is sent to the context queue. The apparatus may also include means for sending the context information compatible with the context queue to one of the wave slots. The apparatus may also include means for converting the context information compatible with the context queue to the information corresponding to the one or more context states of at least one context register. The apparatus can also include means for storing the information corresponding to the one or more context states of at least one context register in one of the wave slots. Moreover, the apparatus can include means for copying the information corresponding to the one or more context states of at least one context register in one of the wave slots when the information corresponding to the one or more context states is sent to the context queue. Also, the apparatus can include means for sending wave data corresponding to the one of the wave slots to one of multiple execution units. The apparatus may also include means for receiving wave data corresponding to the one of the wave slots from one of the execution units. Further, the apparatus can include means for converting the wave slots to execution slots.

The subject matter described herein can be implemented to realize one or more benefits or advantages. For instance, the described graphics processing techniques can be used by GPUs or other graphics processors to enable increased wave data processing or execution. This can also be accomplished at a low cost compared to other graphics processing techniques. Moreover, the graphics processing techniques herein can improve or speed up the data processing or execution. Further, the graphics processing techniques herein can improve a GPU's resource or data utilization and/or resource efficiency. Additionally, aspects of the present disclosure can mitigate congestion and/or clock speed degradation in a GPU.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, comprising:
   determining one or more context states of at least one context register in each of a plurality of wave slots;
   sending, to a context queue, information corresponding to the one or more context states of at least one context register in at least one of the plurality of wave slots, wherein the information corresponding to the one or more context states of at least one context register is sent to the context queue when data corresponding to one of the plurality of wave slots is sent to one of a plurality of execution units;
   converting the information corresponding to the one or more context states of at least one context register in at least one of the plurality of wave slots to context information compatible with the context queue;
   storing the context information compatible with the context queue in the context queue; and
   sending the context information compatible with the context queue to one of the plurality of wave slots when data corresponding to the one of the plurality of wave slots is received from one of the plurality of execution units.

2. The method of claim 1, further comprising:
   removing the one or more context states of at least one context register from the at least one of the plurality of wave slots when the information corresponding to the one or more context states of at least one context register in the at least one of the plurality of wave slots is sent to the context queue.

3. The method of claim 1, further comprising:
   converting the context information compatible with the context queue to the information corresponding to the one or more context states of at least one context register; and
   storing the information corresponding to the one or more context states of at least one context register in one of the plurality of wave slots.

4. The method of claim 1, further comprising:
   copying the information corresponding to the one or more context states of at least one context register in one of the plurality of wave slots when the information corresponding to the one or more context states of at least one context register in one of the plurality of wave slots is sent to the context queue.

5. The method of claim 1, further comprising:
   sending data corresponding to the one of the plurality of wave slots to one of a plurality of execution units.

6. The method of claim 1, further comprising:
receiving data corresponding to the one of the plurality of wave slots from one of a plurality of execution units.

7. The method of claim 1, further comprising:
converting the plurality of wave slots to a plurality of execution slots.

8. The method of claim 7, wherein a number of the plurality of execution slots is less than or equal to a number of the plurality of wave slots.

9. The method of claim 1, wherein the information corresponding to the one or more context states of at least one context register in one of the plurality of wave slots is converted using a data cross bar.

10. The method of claim 1, wherein the plurality of wave slots are in a graphics processing pipeline of a graphics processing unit (GPU).

11. The method of claim 1, wherein the plurality of wave slots and a plurality of execution units are in a streaming processor (SP).

12. The method of claim 11, wherein a number of the plurality of wave slots is greater than or equal to a number of the plurality of execution units.

13. An apparatus for graphics processing, comprising:
a memory; and
at least one processor coupled to the memory and configured to:
determine one or more context states of at least one context register in each of a plurality of wave slots;
send, to a context queue, information corresponding to the one or more context states of at least one context register in one of the plurality of wave slots, wherein the information corresponding to the one or more context states of at least one context register is sent to the context queue when data corresponding to one of the plurality of wave slots is sent to one of a plurality of execution units;
convert the information corresponding to the one or more context states of at least one context register in one of the plurality of wave slots to context information compatible with the context queue;
store the context information compatible with the context queue in the context queue; and
send the context information compatible with the context queue to one of the plurality of wave slots when data corresponding to the one of the plurality of wave slots is received from one of the plurality of execution units.

14. The apparatus of claim 13, wherein the at least one processor is further configured to:
remove the one or more context states of at least one context register from the at least one of the plurality of wave slots when the information corresponding to the one or more context states of at least one context register in the at least one of the plurality of wave slots is sent to the context queue.

15. The apparatus of claim 13, wherein the at least one processor is further configured to:
convert the context information compatible with the context queue to the information corresponding to the one or more context states of at least one context register; and
store the information corresponding to the one or more context states of at least one context register in one of the plurality of wave slots.

16. The apparatus of claim 13, wherein the at least one processor is further configured to:
copy the information corresponding to the one or more context states of at least one context register in one of the plurality of wave slots when the information corresponding to the one or more context states of at least one context register in one of the plurality of wave slots is sent to the context queue.

17. The apparatus of claim 13, wherein the at least one processor is further configured to:
send data corresponding to the one of the plurality of wave slots to one of a plurality of execution units.

18. The apparatus of claim 13, wherein the at least one processor is further configured to:
receive data corresponding to the one of the plurality of wave slots from one of a plurality of execution units.

19. The apparatus of claim 13, wherein the at least one processor is further configured to:
convert the plurality of wave slots to a plurality of execution slots.

20. The apparatus of claim 19, wherein a number of the plurality of execution slots is less than or equal to a number of the plurality of wave slots.

21. The apparatus of claim 13, wherein the information corresponding to the one or more context states of at least one context register in one of the plurality of wave slots is converted using a data cross bar.

22. The apparatus of claim 13, wherein the plurality of wave slots are in a graphics processing pipeline of a graphics processing unit (GPU).

23. The apparatus of claim 13, wherein the plurality of wave slots and a plurality of execution units are in a streaming processor (SP).

24. The apparatus of claim 23, wherein a number of the plurality of wave slots is greater than or equal to a number of the plurality of execution units.

25. A non-transitory computer-readable medium storing computer executable code for graphics processing, comprising code to:
determine one or more context states of at least one context register in each of a plurality of wave slots;
send, to a context queue, information corresponding to the one or more context states of at least one context register in one of the plurality of wave slots, wherein the information corresponding to the one or more context states of at least one context register is sent to the context queue when data corresponding to one of the plurality of wave slots is sent to one of a plurality of execution units;
convert the information corresponding to the one or more context states of at least one context register in one of the plurality of wave slots to context information compatible with the context queue;
store the context information compatible with the context queue in the context queue; and
send the context information compatible with the context queue to one of the plurality of wave slots when data corresponding to the one of the plurality of wave slots is received from one of the plurality of execution units.

* * * * *